US010482569B2

(12) United States Patent
Dunham et al.

(10) Patent No.: US 10,482,569 B2
(45) Date of Patent: Nov. 19, 2019

(54) IMAGE DATA ENCRYPTION AND RENDERING SYSTEM

(71) Applicant: DISC Intellectual Properties, LLC, Burbank, CA (US)

(72) Inventors: Steven B. Dunham, Seattle, WA (US); Darren P. Ehlers, Park City, UT (US)

(73) Assignee: DISC INTELLECTUAL PROPERTIES, LLC, Burbank, CA (US)

(*) Notice: Subject to any disclaimer, the term of this patent is extended or adjusted under 35 U.S.C. 154(b) by 131 days.

(21) Appl. No.: 15/643,113

(22) Filed: Jul. 6, 2017

(65) Prior Publication Data

US 2018/0012329 A1    Jan. 11, 2018

Related U.S. Application Data

(60) Provisional application No. 62/360,764, filed on Jul. 11, 2016.

(51) Int. Cl.
| | |
|---|---|
| *G06K 9/00* | (2006.01) |
| *G06T 1/60* | (2006.01) |
| *G06T 1/00* | (2006.01) |
| *G06F 21/62* | (2013.01) |
| *H04N 19/00* | (2014.01) |
| *H04N 19/60* | (2014.01) |

(52) U.S. Cl.
CPC ............ *G06T 1/60* (2013.01); *G06F 21/6209* (2013.01); *G06T 1/0021* (2013.01); *H04N 19/00* (2013.01); *H04N 19/60* (2014.11); *G06F 2221/032* (2013.01)

(58) Field of Classification Search
CPC ......... G06T 1/60; G06T 1/0021; H04N 19/60; H04N 19/00; G06F 21/6209; G06F 2221/032
See application file for complete search history.

(56) References Cited

U.S. PATENT DOCUMENTS

| | | | | |
|---|---|---|---|---|
| 5,301,018 | A * | 4/1994 | Smidth | ................. H04N 5/907 348/472 |
| 7,046,820 | B2 * | 5/2006 | Yu | ......................... G06T 1/0028 358/3.28 |
| 9,793,949 | B1 * | 10/2017 | Johnson | ............. H04W 74/085 |
| 10,179,031 | B2 * | 1/2019 | Haimerl | ................. G16H 50/70 |
| 2004/0013284 | A1 * | 1/2004 | Yu | ......................... G06T 1/0028 382/100 |
| 2016/0217545 | A1 * | 7/2016 | Diehl | .................... G06T 1/0021 |

\* cited by examiner

*Primary Examiner* — Shefali D Goradia
(74) *Attorney, Agent, or Firm* — K&L Gates LLP (57) ABSTRACT

Systems, devices, and techniques are generally described to transmit image data. An image file including image data may be identified. The image data may be divided into a plurality of portions. The plurality of portions may include a first portion corresponding to a first position in the image data and a second portion corresponding to a second position in the image data. The image data may be modified to produce a shuffled image. The shuffled image may indicate that the first portion corresponds to a third position and the second portion corresponds to a fourth position. The shuffled image may be sent to a recipient computing device. The recipient computing device may render the first portion at the first position and the second portion at the second position to display the image data.

20 Claims, 5 Drawing Sheets

IMAGE DATA ENCRYPTION AND RENDERING SYSTEM

CROSS-REFERENCE TO RELATED APPLICATIONS

This application claims the benefit of U.S. Provisional Application No. 62/360,764, filed Jul. 11, 2016, the disclosure of which is incorporated herein by reference in its entirety.

FIELD

This application relates generally to encryption and secure display of image files.

BACKGROUND

Sensitive image data may be transmitted between computing devices. Current encryption techniques allow image files to be encrypted for transmission over networks and decrypted once the file has reached its destination node. Typically, after decryption, image files can be saved in memory, shared, displayed, and/or manipulated similar to any file. In other words, after an image file has been decrypted, the sender of the file no longer maintains control over the image file. Such image files may include sensitive material that may be targeted by hackers and thieves.

SUMMARY

In accordance with embodiments of the present invention, a computer-implemented method of transmitting image data is described. In various examples, the method may comprise identifying an image file including image data. In some examples, the image data may be divided into a plurality of portions. The plurality of portions may include a first portion corresponding to a first position in the image data and a second portion corresponding to a second position in the image data. In some further examples, the method may further comprise modifying the image data to produce shuffled image data. In various examples, the shuffled image data may indicate that the first portion corresponds to a third position and the second portion corresponds to a fourth position. In some examples, the method may further comprise sending the shuffled image to a recipient computing device. In various examples, the method may comprise rendering, by the recipient computing device, the first portion at the first position and the second portion at the second position to display the image data.

In various examples, the computer-implemented method may further comprise sending a memory hash to the recipient computing device. In some examples, the memory hash may include first data indicating that the first portion corresponds to the first position and second data indicating that the second portion corresponds to the second position. In some further examples, the method may further include selecting dimensions of each of the plurality of portions. In various examples, the selected dimensions may comprise a number of pixels that is compliant with a decompression technique of a browser of the recipient computing device.

In some embodiments, the memory hash sent to the recipient computing device may include identification data effective to identify the image data from among other image data.

In still other embodiments, the computer-implemented method may further comprise generating a plurality of pseudo-random numbers using a pseudo-random number generator. In various examples, the modifying the image data to produce the shuffled image data may include inputting the plurality of pseudo-random numbers and the plurality of portions of the image data into a Fisher-Yates shuffle algorithm. In some examples the computer-implemented method may further include sending a memory hash to the recipient computing device. The memory hash may include the plurality of pseudo-random numbers. A first pseudo-random number of the plurality of pseudo-random numbers may indicate that the first portion corresponds to the first position. A second pseudo-random number of the plurality of pseudo-random numbers may indicate that the second portion corresponds to the second position.

In another example embodiment, the recipient computing device may be effective to decompress the shuffled image data. The recipient computing device may use clipped drawing operations to render the first portion at the first position and the second portion at the second position to display the image data.

In yet another example embodiment, the image file may be a JPEG image file. In various further examples, the computer-implemented method may further comprise selecting a size of each of the plurality of portions in terms of a number of pixels that complies with JPEG compression techniques of the recipient computing device.

In some further examples, a computer-implemented method of rendering image data is generally described. The computer-implemented method may include receiving, at a computing device, shuffled image data. In some examples, the shuffled image data may comprise a plurality of portions. The plurality of portions may include a first portion corresponding to a first position in the shuffled image data and a second portion corresponding to a second position in the shuffled image data. In some further examples, the method may include receiving, at the computing device, a memory hash. In some examples, the memory hash may include first data indicating that the first portion corresponds to a third position and second data indicating that the second portion corresponds to a fourth position. In various other examples, the method may further include determining, based on the first data, that the first portion corresponds to the third position. In still other examples, the method may further include determining, based on the second data, that the second portion corresponds to the fourth position. In another example, the method may further include rendering, by a browser of the computing device, the first portion at the third position and the second portion at the fourth position to display an unshuffled image.

In another example embodiment, the first portion and the second portion may be vertical or horizontal strips of pixels of image data.

In an example embodiment, the first portion and the second portion may be blocks of pixels comprising a height in terms of a first number of pixels and a width in terms of a second number of pixels. In some examples, the first number of pixels may be less than a third number of pixels. The third number of pixels may represent a width of the unshuffled image. The second number of pixels may be less than a fourth number of pixels. In various examples, the fourth number of pixels may represent a height of the unshuffled image.

In another embodiment, the first data may include a first pseudo-random number. The first pseudo-random number may indicate that the first portion corresponds to the third position in the unshuffled image. In some examples, the second data may include a second pseudo-random number.

In some examples, the second pseudo-random number may indicate that the second portion corresponds to the fourth position in the unshuffled image.

In another embodiment, the first pseudo-random number may be associated with a first index value of the shuffled image data and the second pseudo-random number may be associated with a second index value of the shuffled image data.

In some examples, the unshuffled image may not be stored in a memory accessible by the computing device.

In another example embodiment, a computer-implemented method of transmitting image data is generally described. In various examples, the method may include identifying an image file including image data. In some examples, the method may further include dividing the image data into a first number of portions. In some other examples, the method may further comprise generating the first number of pseudo-random numbers. In some examples, each of the pseudo-random numbers may correspond to a respective one of the first number of portions. In some examples, values of the pseudo-random numbers may correspond to positions for the respective portions in shuffled image data. In some further examples the method may further include modifying the image data to produce the shuffled image data. In some examples, in the shuffled image data, each of the first number of portions may be located at a respective position indicated by the value of the respective pseudo-random number. In some further examples, the method may further comprise sending the shuffled image data to a recipient computing device. In various other examples, the method may further comprise sending the first number of pseudo-random numbers to the recipient computing device.

In another example embodiment, the method may further comprise sending an identifier of an image file including the image data in a memory hash to the recipient computing device.

In some other examples, the method may further comprise selecting dimensions of each of the first number of portions in terms of a number of pixels that is compliant with a decompression technique of a browser of the recipient computing device.

In another example embodiment, the recipient computing device may be effective to render unshuffled image data based on the first number of pseudo-random numbers.

In another example embodiment, the image data may include watermark data that when rendered on a display depicts a watermark.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Systems and methods are provided for securely transmitting and displaying image data, in accordance with various embodiments of the present disclosure. Image data representing an image may be divided into one or more portions. As is described in further detail below, portions may comprise vertical strips, horizontal strips, blocks or other divisions of the image data. Each portion may include a plurality of pixels, with each pixel being associated with a particular pixel value. In various examples, each portion may be chosen such that the portion is of the same size, shape, and dimensions as each other portion. The size of the portions may be chosen according to particular image compression techniques. For example, native JPEG compression techniques may operate on 16 pixel-wide image data during compression. For this reason, the portions may be chosen such that the pixel-width and/or pixel-height of the portions include a number of pixels that is a multiple of 16.

The portions of the image data may be shuffled according to an algorithm for generating a random permutation of the set of portions of the image data. For example, the Fisher-Yates shuffle may be employed to shuffle the portions of image data in the image to produce a shuffled image. In such a shuffled image, a first portion originally corresponding to a first location, prior to shuffling, may be located at a second position. The second position may be generated by the particular shuffling algorithm used. As will be described in further detail below, a pseudo-random number generator algorithm may be employed to seed the shuffle algorithm. The shuffled image may be compressed and transmitted to one or more client computing devices. Separately, a secret including one or more pseudo-random numbers employed by the shuffle algorithm to generate the shuffled image may be transmitted to the one or more client computing devices. In various examples, the secret may be a hash of the one or more pseudo-random number values. In some further examples, the secret may be a hash that includes the one or more pseudo-random number values as well as one or more identifying features of the image. For example, a reference number, page number, serial number, per-document key, or the like, may be hashed together with the one or more pseudo-random number values and sent to the one or more client devices.

Upon receipt of the shuffled image, a particular client computing device may decompress the shuffled image. If encryption techniques such as asymmetric cryptography were used to protect the shuffled image file during transmission, the client computing device may decrypt the encrypted shuffled image. The particular client computing device may separately receive the secret. As will be discussed in further detail below, a browser of the client device may use clipped drawing operations to render the shuffled portions of the image data into the correct, pre-shuffled positions based on the secret. The pseudo-random numbers of the secret may indicate the correct, pre-shuffled positions of the shuffled portions of the image. Accordingly, the unshuffled, original image data may be rendered by the browser. However, the unshuffled image data may not be stored in the memory of the client computer. Additionally, access of the image data through developer tools of the browser may yield only the shuffled image.

Figure 1:
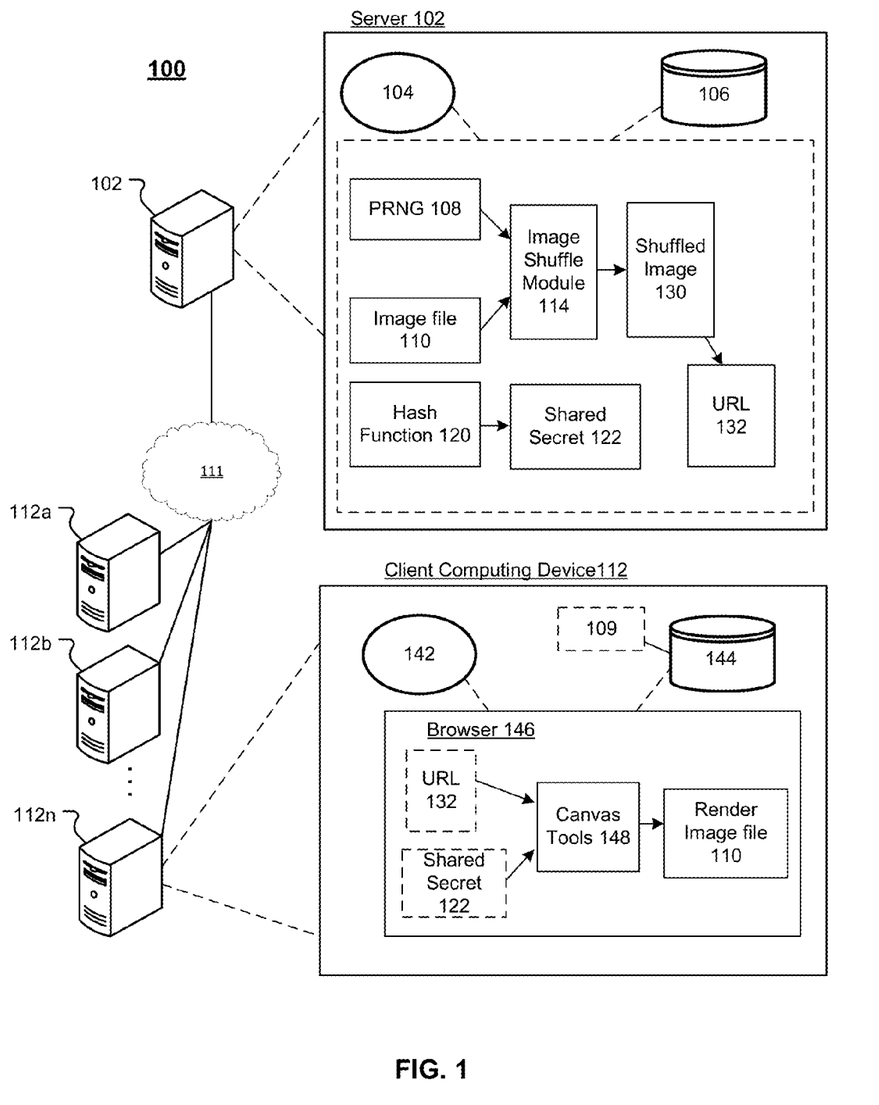
FIG. 1 illustrates an example system for transmitting and rendering encrypted image data, in accordance with embodiments of the present disclosure.

FIG. 1 illustrates an example system 100 for transmitting and rendering encrypted image data, in accordance with embodiments of the present disclosure. System 100 may include a server 102 and one or more client computing devices 112 (including client computing device 112a, 112b, . . . , 112n). Server 102 and client devices 112 may be configured to be in communication with one another via network 111. Network 111 may be for example, a local area network, a wide area network, the internet, or the like. Server 102 may include at least one processor 104 configured to be in communication with a non-transitory computer-readable memory 106. Computer-readable memory 106 may store instructions that, when executed, are effective to cause the at least one processor 104 to perform one or more of the actions described below.

Server 102 may store one or more image files, in computer-readable memory 106. Image files may include image data that when rendered on a display, produce an image. For example, image 110 may be image data representing an image. Image 110 may be stored in any image file format such as a PDF, .JPG, .PNG, etc. As will be described in further detail below, the at least one processor 104 may divide the image 110 into one or more portions of pixel data. Portions may include rectangular or non-rectangular blocks of pixels, vertical strips of pixels, horizontal strips of pixels, diagonal strips of pixels, or portions of pixels exhibiting other shapes. Processor 104 may divide image 110 into a plurality of equally sized and shaped portions of pixels. For example, processor 104 may divide an image 110 into 500 portions, with each portion being a block 16 pixels in width and 16 pixels in height. In another example, an image 110 may be divided into a number of vertical strips, with each strip being 32 pixels in width. Each portion of the divided image 110 may be associated with a corresponding position of that particular portion. In some examples, the position may be represented by an index value and/or by coordinates or other indicators showing where a particular potion is located in the rendered image.

Image 110 may be provided as an input to an image shuffle module 114. Image shuffle module may employ a shuffling algorithm such as the Fisher-Yates shuffle to modify the positions of the portions of image 110 such that a random permutation of the set of the portions of the image 110 is generated. For example, image shuffle module 114 may modify the image 110 to produce shuffled image data. As will be described in further detail below, the shuffled image data may indicate that particular portions of image data correspond to positions that are different from the positions of that same image data in the original, unshuffled image 110. Although the Fisher-Yates shuffle is described herein, any shuffling algorithm that produces a random permutation of the input set of portions of image 110 may be employed in accordance with the disclosure. For example, an image 110 may be divided into 5 vertical strips A, B, C, D, and E at respective positions (e.g. index values) 0, 1, 2, 3, and 4, from left to right. Accordingly, image 110 may be represented as the set {A, B, C, D, E}. Image shuffle module 114 may generate a random permutation of the set of positions for the 5 vertical strips. For example, image shuffle module 114 may produce the set of positions {2, 0, 4, 1, 3} for the respective vertical strips A, B, C, D, and E. Accordingly, in shuffled image 130, vertical strip A may be positioned at position 2, vertical strip B may be located at position 0, vertical strip C may be located at position 4, vertical strip D may be located at position 1, and vertical strip E may be located at position 3. Accordingly, shuffled image 130 may be represented as the set of portions {B, D, A, E, C}.

Image shuffle module 114 may use a pseudo-random number generator (PRNG) 108 in order to generate a random permutation of the set of positions of the portions of image 110. Each pseudo-random number used to generate a particular shuffled image 130 may be hashed by hash function 120 to produce a memory hash of a shared secret 122. The pseudo-random numbers hashed to form shared secret 122 may denote the correct positions of the portions of image 110, and, as such, may serve as a key to decrypting shuffled image 130.

In some examples, one or more other features of image 110 may be hashed together with the pseudo-random numbers used to generate the shuffled image 130 to produce shared secret 122. Examples of such other features may include a page number, an identification number, and/or an identification code of image 110. In some examples, instead of being provided by PRNG 108 at server 102, the pseudo-random numbers used to generate the shuffled image 130 may be provided by a PRNG 109 of client computing device 112.

Shared secret 122 may be encrypted using asymmetric cryptography, or other cryptographic techniques, and sent using a secure communication channel (such as a Transport Layer Security (TLS) channel or a Secure Sockets Layer (SSL) channel) to a recipient client computing device 112. Client computing device 112 may receive and decrypt shared secret 122. Separately, a uniform resource locator (URL) 132 may be sent from server 102 to client computing device 112. URL 132 may include embedded image data representing shuffled image 130. In various examples, URL 132 may be sent via a different communication channel relative to shared secret 122. URL 132 may also be encrypted using asymmetric cryptography, or other cryptographic techniques for transmission between server 102 and client computing device 112. Additionally, a secure communication channel may be established using TLS or SSL and may be used to transmit URL 132 between server 102 and client computing device 112.

Client computing device 112 may include at least one processor 142 and a computer-readable memory 144. Client computing device 112 may execute a browser 146. Client computing device 112 may receive URL 132 from server 102 at browser 146 through an authenticated session established between a user of client computing device 112 and server 102. Client computing device 112 may receive shared secret 122 from server 102 at browser 146. If a user of client computing device 112 attempts to use developer tools of browser 146 to access image data embedded in URL 132, the user can only access the shuffled image 130 that is embedded in URL 132. Therefore, the user may be unable to discern the unshuffled image 110.

The at least one processor 142 may use the pseudo-random numbers hashed in shared secret 122 to determine the correct positions at which to render the portions of shuffled image 130 in order to reproduce the image 110 with all portions at their original, unshuffled positions. In various examples, each pseudo-random number in shared secret 122 may be associated with a particular position or index value of shuffled image 130. The value of each pseudo-random number may denote the correct position at which to render the relevant portion of image 110. Additionally, the at least one processor 142 may identify data in shared secret 122 that identifies the particular image 110. For example, image 110 may be a page of a movie script. The at least one processor 142 may identify a page number of the script hashed in shared secret 122. In such an example, each page of the script may be uniquely and independently shuffled by image shuffle module 114. Accordingly, each page of the script is associated with a different set of pseudo-random numbers and a different shared secret 122. Accordingly, it may be important to identify the particular image 110 (e.g., the particular page) to which the shared secret 122 pertains in order to properly determine the correct positions for the shuffled portions of the image.

The at least one processor 142 may provide the correct positions for the portions of the particular image 110 (e.g., the particular page) to canvas tools 148 of browser 146. Canvas tools 148 may be used to draw graphics using script such as JavaScript. Canvas tools 148 may use clipped drawing operations to render each portion of image 110 at the correct, unshuffled position. Clipped drawing operations allow a browser to render a particular portion of an image within a defined area, as opposed to rendering the entire image at once. Accordingly, the original image 110 may be displayed by the browser 146 without storing the unshuffled image 110 in computer-readable memory 144 or another memory of client computing device 112. Additionally, if a hacker or thief is able to steal the image file embedded in URL 132, only shuffled image 130 will be displayed upon rendering the stolen file.

The authenticated session between client computing device 112 and server 102 may be implemented in browser 146 and may require user credentials, such as a user name and password. Additional security controls may be provided within the authenticated session. For example, right-clicking and/or hot keys may be disabled within the authenticated session, so that the user is not able to save, download, and/or print the properly rendered image 110. Additionally, in some examples, the properly rendered image 110 may only be displayed for limited amounts of time and/or may require a user to reenter their credentials after a period of inactivity. Furthermore, watermarks or other identifying features may be applied to image 110 prior to shuffling. The watermark may be shuffled along with the rest of the image and may be reproduced when the image file is rendered by client computing device 112 in a properly authenticated session.

Figure 2:
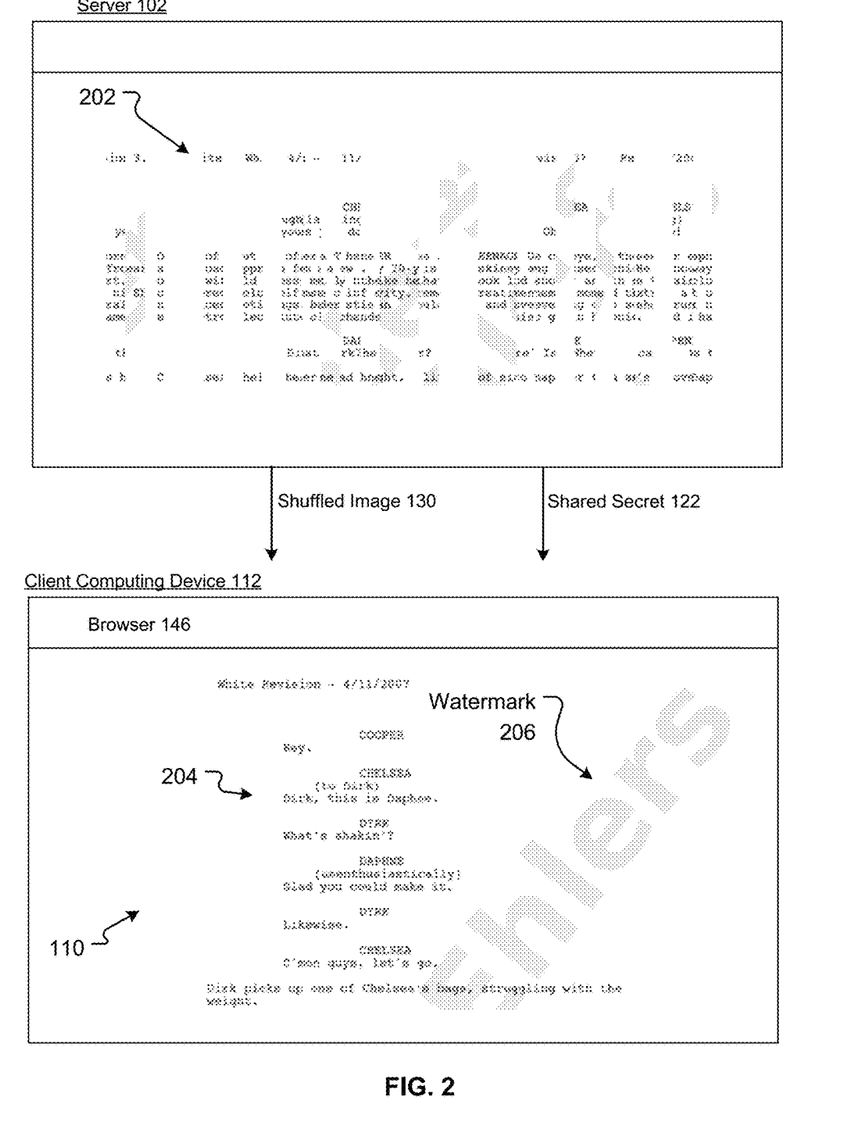
FIG. 2 illustrates an example of a shuffled, encrypted image and a decrypted image rendered in a browser, in accordance with embodiments of the present disclosure.

FIG. 2 illustrates an example depiction of shuffled image 130 and an example of an unshuffled, properly rendered image 110 rendered by browser 146. In the example shown in FIG. 2, the original image file has been divided into a number of vertical strips pixels. The vertical strips of the original image have been shuffled by image shuffle module 114 (shown in FIG. 1) of server 102 to produce shuffled image 130. As shown in FIG. 2, the text 202 of shuffled image 130 is incomprehensible. Additionally, watermark 206 has been shuffled along with the vertical strips of the original image.

Server 102 may transmit shuffled image 130 to client computing device 112. Separately, server 102 may transmit shared secret 122 to client computing device 112. Browser 146 of client computing device 112 may use the pseudo-random numbers hashed in shared secret 122 and any image file identification info hashed in shared secret 122 to determine the correct positions at which to render the shuffled vertical strips of shuffled image 130 in order to properly display unshuffled image 110. Browser 146 may use clipped drawing operations to render the vertical strips of shuffled image 130 in the correct original positions to display image 110 including unshuffled text 204 and the original watermark 206.

Figure 3:
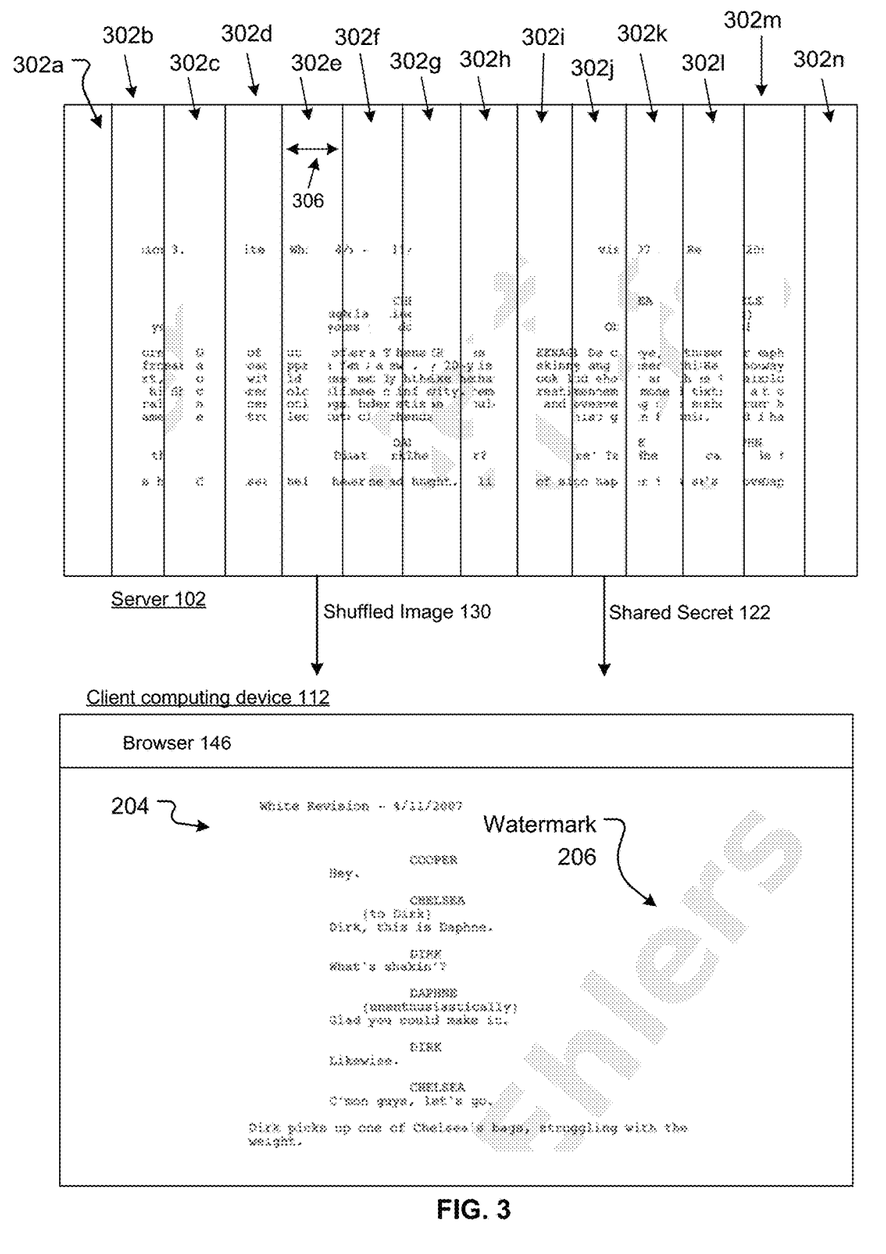
FIG. 3 illustrates an example of a shuffled, encrypted image including one or more shuffled portions and a decrypted image rendered in a browser, in accordance with various embodiments of the present disclosure.

FIG. 3 illustrates an example of a shuffled image 130 including shuffled portions 302a-302n. In the example depicted in FIG. 3, portions 302a, 302b, 302c, 302d, 302e, 302f, 302g, 302h, 302i, 302j, 302k, 302l, 302m, and 302n have been shuffled from their original positions in image 110 to new positions via image shuffle module 114 (depicted in FIG. 1). Pseudo-random numbers generated by PRNG 108 or PRNG 109 (depicted in FIG. 1) are used to generate a random permutation of the set of positions for the set of portions of image 110 to produce shuffled image 130 depicted in FIG. 3. The pseudo-random numbers used to shuffle image 110 are hashed to produce shared secret 122. The pseudo-random numbers of shared secret 122 denote the proper, unshuffled positions of portions 302a, 302b, 302c, 302d, 302e, 302f, 302g, 302h, 302i, 302j, 302k, 302l, 302m, and 302n. Browser 146 may render portions 302a-302n in the proper, unshuffled positions based on shared secret 122 to display the unshuffled text 204 and unshuffled watermark 206. Although in the examples depicted in FIGS. 2 and 3, text is shown, the images may instead be pictures or some combination of pictures and text, depending on the particular image file.

Additionally, although in FIG. 3 the divided portions 302a, 302b, 302c, 302d, 302e, 302f, 302g, 302h, 302i, 302j, 302k, 302l, 302m, and 302n of image 110 are shown as vertical strips, any shapes and/or sizes of portions may be used in accordance with the present disclosure. For example, image 110 may be divided into rows and columns of rectangular blocks with each block being associated with a particular index value. Image shuffle module 114, depicted in FIG. 1, may generate a random permutation of the set of blocks. For example, after shuffling, the block at a position 1 (denoted by index value 1) may be swapped with the block at a position 14 (denoted by index value 14). Shared secret 122 may include the pseudo-random numbers used by image shuffle module 114 to generate the random permutation of the set of blocks. The pseudo-random number may, in turn, denote the original position of the blocks and may be used by client computing device 112 to render the blocks in their original, unshuffled positions.

As shown in FIG. 3, the portions of shuffled image 130, such as portions 302a, 302b, 302c, 302d, 302e, 302f, 302g, 302h, 302i, 302j, 302k, 302l, 302m, and 302n, may have particular dimensions in terms of a number of pixels. For example, portion 302e may be a vertical strip of pixels having a width 306. Native browser decompression tools may be leveraged by selecting compliant portion dimensions. For example, browser 146 may employ decompression tools that operate on multiples of 8 pixels. As such, server 102 may select portions 302a, 302b, 302c, 302d, 302e, 302f, 302g, 302h, 302i, 302j, 302k, 302l, 302m, and 302n such that the dimensions of the portions are multiples of 8 pixels. In the example, width 306 of portion 302e may be 8, 16, 24, 32, 40, etc. pixels wide. In examples where the width of the image 110 is not evenly divisible by a number of pixels that is suitable for native browser decompression, the remainder pixels on the left-hand, right-hand, top and/or bottom margin may be left unshuffled. For example, native browser decompression may use JPEG compression that operates on 8×8 pixel blocks, 16×8 pixel blocks, or 16×16 pixel blocks. Image 110 may be divided into block-shaped portions that are 64 pixels in width. After dividing image 110 into the block-shaped portions, the right-hand margin of the image may have a remainder of X pixels. These X pixels in the right-hand margin may not be shuffled in order to maintain compressibility by the native browser decompression tool.

In some other examples, native browser decompression tools may be leveraged by selecting portions according to characteristics other than portion dimensions. For example, PNG compression leverages similarities between rows of pixels. Portions may be selected by determining similarities between pixel values in regions of the image 110 in order to maintain similarities between pixel values and leverage native PNG compression techniques.

Figure 4:
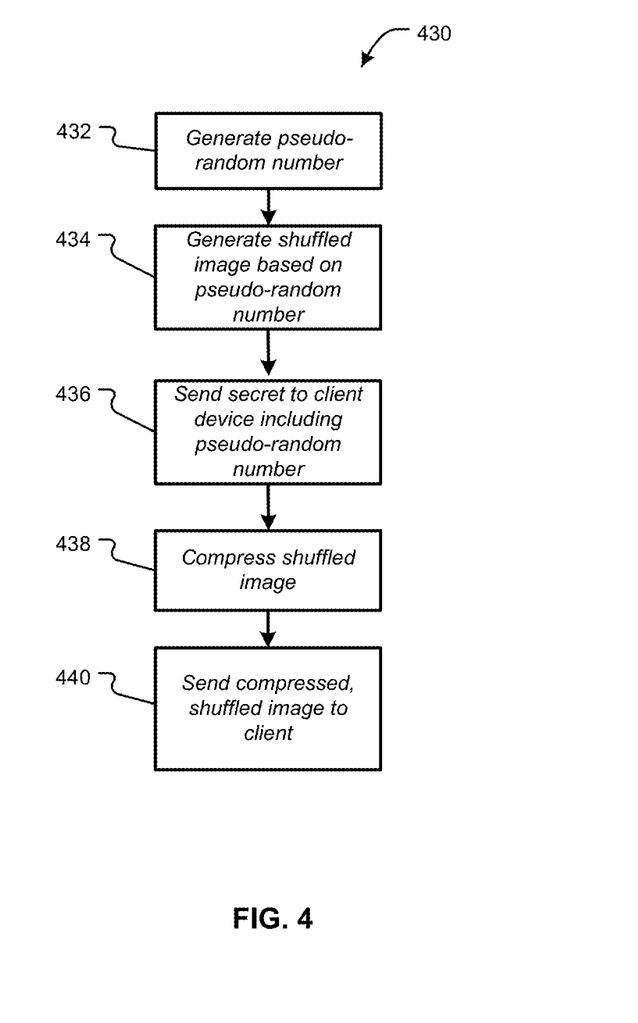
FIG. 4 depicts a computer-implemented process flow for sending a compressed, shuffled image to a client computing device, in accordance with various embodiments of the present disclosure.

FIG. 4 depicts a computer-implemented process flow 430 for sending a compressed, shuffled image from a first computing device to a second computing device, in accordance with various embodiments of the present disclosure.

In various examples, process flow 430 may be performed in whole or in part by server 102 depicted in FIG. 1. For example, at least one processor 104 may be effective to perform one or more of the actions described in process flow 430. Processing may begin at action 432, "Generate pseudo-random number". At action 432, a pseudo-random number generator, such as PRNG 108 or PRNG 109 may generate a pseudo-random number. The pseudo-random number may be input to the image shuffle module 114.

Process flow 430 may continue from action 432 to action 434, "Generate shuffled image based on pseudo-random number". At action 434, image shuffle module 114 may use the pseudo-random number to generate a random permutation of positions of portions of image 110. The portions of image 110 may be shuffled according to the random permutation generated by image shuffle module 114 to produce shuffled image 130.

Process flow 430 may proceed from action 434 to action 436, "Send secret to client device including pseudo-random number". At action 436, shared secret 122 may be sent from server 102 to client computing device 112. In various examples, the shared secret 122 may include the pseudo-random numbers used by image shuffle module 114 to produce shuffled image 130. The pseudo-random numbers included in the shared secret 122 may denote the correct positions at which to render the shuffled portions of shuffled image 130 to display the original image 110. In various further examples, the shared secret may include data identifying the image 110 from among other images.

Process flow 430 may proceed from action 436 to action 438, "Compress shuffled image". At action 438, the shuffled image 130 may be compressed. Sizes and/or dimensions of the portions of shuffled image 130 may be selected in order to use compression techniques that are compatible with the particular sizes and/or dimensions of the portions.

Process flow 430 may proceed from action 438 to action 440, "Send compressed, shuffled image to client". At action 440, server 102 may send the compressed, shuffled image 130 to the client computing device 112. In various examples, server 102 may send URL 132 to client computing device 112. Image data representing shuffled image 130 may be embedded within URL 132.

Figure 5:
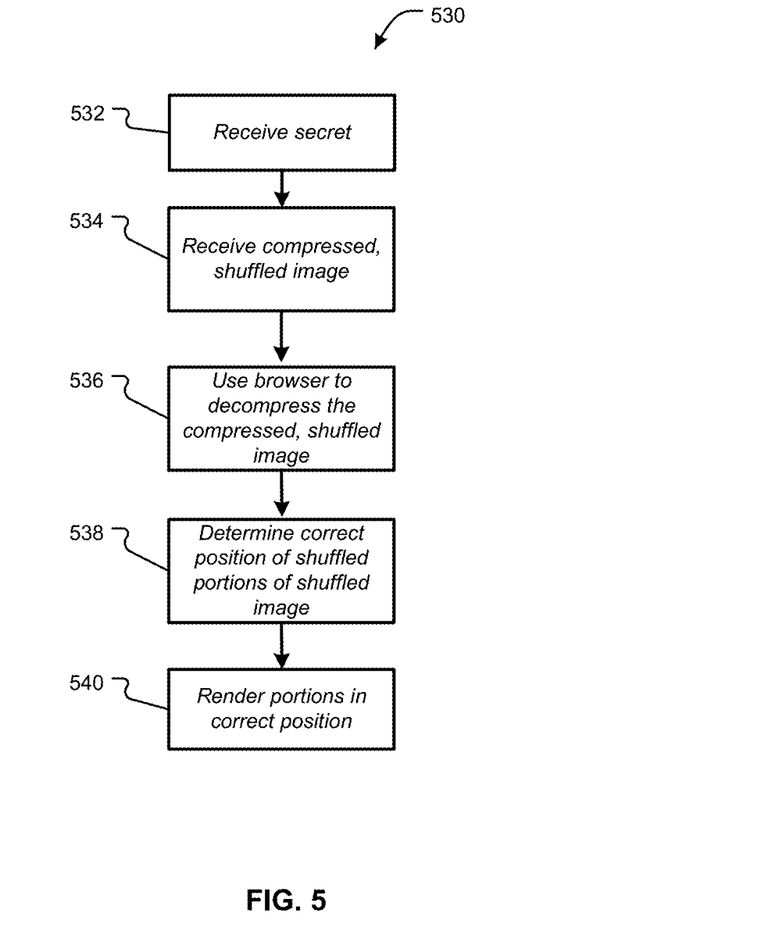
FIG. 5 depicts a computer-implemented process flow for rendering shuffled portions of image data in correct positions, in accordance with various embodiments of the present disclosure.

FIG. 5 depicts a computer-implemented process flow 530 for rendering shuffled portions of image data in correct positions, in accordance with various embodiments of the present disclosure.

In various examples, process flow 530 may be performed in whole or in part by client computing device 112 depicted in FIG. 1. For example, at least one processor 142 may be effective to perform one or more of the actions described in process flow 530. Processing may begin at action 532, "Receive secret". At action 532, client computing device 112 may receive shared secret 122 from server 102. As described, shared secret 122 may be a memory hash including pseudo-random numbers used by image shuffle module 114 to produce shuffled image 130. Additionally, in at least some examples, shared secret 122 may include data identifying image 110 from among other image files. In some examples, such data may include a reference number or code, a per-document key, a serial number, and/or a page number.

Processing may proceed from action 532 to action 534, "Receive compressed shuffled image". At action 534, the compressed, shuffled image 130 may be received from server 102 at a recipient computing device. In some examples, URL 132 may be received from server 102. Shuffled image 130 may be embedded in URL 132.

Processing may proceed from action 534 to action 536, "Use browser to decompress the compressed, shuffled image". At action 536, browser 146 of client computing device 112 may decompress the shuffled image 130 using native browser compression/decompression tools.

Processing may proceed from action 536 to action 538, "Determine correct position of shuffled portions of shuffled image". At action 538, at least one processor 142 of client computing device 112 may determine the correct positions at which to render the portions of shuffled image 130. The pseudo-random numbers included in shared secret 122 may correspond to index values that indicate the correct positions of the portions of shuffled image 130.

Processing may proceed from action 538 to action 540, "Render portions in correct position". At action 540, browser 146 of client computing device 112 may render the portions of shuffled image 130 in the correct positions in order to display unshuffled image 110.

Among other potential benefits, a system in accordance with the present disclosure may allow for improved security of image files that have been transmitted over a network to a potentially unsecure client device. According to the techniques described herein, only the scrambled, shuffled image is available at the client-side device. Accordingly, use of development tools to access the image will yield only the shuffled image which is of little value to a would-be thief. Additionally, hashing together the pseudo-random numbers used to shuffle the image together with a per-document, per-image, and/or per-page number identifier may provide added security since the secret hashes are sent separately from the shuffled images. A thief targeting the transmitted content may be unable to determine any correspondence between the secret hash and a particular shuffled image.

Further, images may be divided in such a way that native browser compression tools may be leveraged based on the size, dimensions or other characteristics of the divided portions of the original image. Using native browser compression tools to compress and decompress the images may reduce latency of the system and improve the speed at which images can be rendered by the recipient computing device.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A computer-implemented method of rendering image data, the method comprising:
    receiving, at a computing device, shuffled image data, wherein the shuffled image data comprises a plurality of portions, wherein the plurality of portions comprises a first portion corresponding to a first position in the shuffled image data and a second portion corresponding to a second position in the shuffled image data;
    receiving, at the computing device, a memory hash, wherein the memory hash comprises first data indicating that the first portion corresponds to a third position and second data indicating that the second portion corresponds to a fourth position;
    determining, based on the first data, that the first portion corresponds to the third position;
    determining, based on the second data, that the second portion corresponds to the fourth position; and
    rendering, by a browser of the computing device, the first portion at the third position and the second portion at the fourth position to display an unshuffled image.

2. The computer-implemented method of claim 1, wherein the memory hash further comprises identification data effective to identify the image data from among other image data.

3. The computer-implemented method of claim 1, wherein the first portion and the second portion are vertical or horizontal strips of pixels of image data.

4. The computer-implemented method of claim 1, wherein:
    the first portion and the second portion are blocks of pixels comprising a height in terms of a first number of pixels and a width in terms of a second number of pixels;
    the first number of pixels is less than a third number of pixels, wherein the third number of pixels represents a width of the unshuffled image; and
    the second number of pixels is less than a fourth number of pixels, wherein the fourth number of pixels represents a height of the unshuffled image.

5. The computer-implemented method of claim 1, wherein:
    the first data comprises a first pseudo-random number, the first pseudo-random number indicating that the first portion corresponds to the third position in the unshuffled image; and
    the second data comprises a second pseudo-random number, the second pseudo-random number indicating that the second portion corresponds to the fourth position in the unshuffled image.

6. The computer-implemented method of claim 5, wherein the first pseudo-random number is associated with a first index value of the shuffled image data and the second pseudo-random number is associated with a second index value of the shuffled image data.

7. The computer-implemented method of claim 1, wherein the unshuffled image is not stored in a memory accessible by the computing device.

8. A system, comprising:
    at least one processor; and
    a non-transitory computer-readable memory storing instructions that, when executed by the at least one processor, are effective to cause the at least one processor to perform a method, comprising:
        receiving shuffled image data, wherein the shuffled image data comprises a plurality of portions, wherein the plurality of portions comprises a first portion corresponding to a first position in the shuffled image data and a second portion corresponding to a second position in the shuffled image data;
        receiving a memory hash, wherein the memory hash comprises first data indicating that the first portion corresponds to a third position and second data indicating that the second portion corresponds to a fourth position;
        determining, based on the first data, that the first portion corresponds to the third position;
        determining, based on the second data, that the second portion corresponds to the fourth position; and
        rendering, by a browser, the first portion at the third position and the second portion at the fourth position to display an unshuffled image.

9. The system of claim 8, wherein the memory hash further comprises identification data effective to identify the shuffled image data from among other image data.

10. The system of claim 8, wherein the first portion and the second portion are vertical or horizontal strips of pixels of image data.

11. The system of claim 8, wherein:
the first portion and the second portion are blocks of pixels comprising a height in terms of a first number of pixels and a width in terms of a second number of pixels;
the first number of pixels is less than a third number of pixels, wherein the third number of pixels represents a width of the unshuffled image; and
the second number of pixels is less than a fourth number of pixels, wherein the fourth number of pixels represents a height of the unshuffled image.

12. The system of claim 8, wherein:
the first data comprises a first pseudo-random number, the first pseudo-random number indicating that the first portion corresponds to the third position in the unshuffled image; and
the second data comprises a second pseudo-random number, the second pseudo-random number indicating that the second portion corresponds to the fourth position in the unshuffled image.

13. The system of claim 12, wherein the first pseudo-random number is associated with a first index value of the shuffled image data and the second pseudo-random number is associated with a second index value of the shuffled image data.

14. The system of claim 8, wherein the unshuffled image is not stored in a memory accessible by the computing device.

15. A computer-implemented method comprising:
receiving, at a computing device, shuffled image data, wherein the shuffled image data comprises a plurality of portions, wherein the plurality of portions comprises a first portion corresponding to a first position in the shuffled image data and a second portion corresponding to a second position in the shuffled image data;
receiving, at the computing device, a memory hash, wherein the memory hash comprises first data indicating that the first portion corresponds to a third position and second data indicating that the second portion corresponds to a fourth position; and
rendering, by a browser of the computing device based at least in part on the memory hash, the first portion at the third position and the second portion at the fourth position to display an unshuffled image.

16. The computer-implemented method of claim 15, wherein the memory hash further comprises identification data effective to identify the shuffled image data from among other image data.

17. The computer-implemented method of claim 15, wherein the first portion and the second portion are vertical or horizontal strips of pixels of image data.

18. The computer-implemented method of claim 15, wherein:
the first portion and the second portion are blocks of pixels comprising a height in terms of a first number of pixels and a width in terms of a second number of pixels;
the first number of pixels is less than a third number of pixels, wherein the third number of pixels represents a width of the unshuffled image; and
the second number of pixels is less than a fourth number of pixels, wherein the fourth number of pixels represents a height of the unshuffled image.

19. The computer-implemented method of claim 15, wherein:
the first data comprises a first pseudo-random number, the first pseudo-random number indicating that the first portion corresponds to the third position in the unshuffled image; and
the second data comprises a second pseudo-random number, the second pseudo-random number indicating that the second portion corresponds to the fourth position in the unshuffled image.

20. The computer-implemented method of claim 19, wherein the first pseudo-random number is associated with a first index value of the shuffled image data and the second pseudo-random number is associated with a second index value of the shuffled image data.

* * * * *